(12) United States Patent
Landry et al.

(10) Patent No.: US 8,850,173 B2
(45) Date of Patent: Sep. 30, 2014

(54) BIOS IMAGE MANAGER (75) Inventors: John Landry, Spring, TX (US); James Luke Mondshine, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 420 days.

(21) Appl. No.: 13/260,307

(22) PCT Filed: Apr. 29, 2009

(86) PCT No.: PCT/US2009/042164
§ 371 (c)(1),
(2), (4) Date: Sep. 24, 2011

(87) PCT Pub. No.: WO2010/126505
PCT Pub. Date: Nov. 4, 2010

(65) Prior Publication Data
US 2012/0023322 A1    Jan. 26, 2012

(51) Int. Cl.
*G06F 9/00* (2006.01)
*G06F 9/24* (2006.01)
*G06F 15/177* (2006.01)
*G06F 9/445* (2006.01)

(52) U.S. Cl.
CPC ....................................... *G06F 8/65* (2013.01)
USPC .................. 713/1; 713/2; 713/100; 711/102; 714/2; 714/15; 714/49; 714/54

(58) Field of Classification Search
CPC ...... G06F 8/65; G06F 11/1658; G06F 3/1225
USPC .......... 713/1, 2, 100; 711/102; 714/2, 15, 49, 714/54
See application file for complete search history.

(56) References Cited

U.S. PATENT DOCUMENTS

| | | | |
|---|---|---|---|
| 6,671,768 B1 * | 12/2003 | Brown | 711/102 |
| 7,010,679 B2 * | 3/2006 | Yang | 713/2 |
| 7,073,053 B1 | 7/2006 | Oz et al. | |
| 7,143,275 B2 * | 11/2006 | Cepulis et al. | 713/1 |
| 7,328,434 B2 | 2/2008 | Swanson et al. | |
| 7,337,309 B2 | 2/2008 | Nguyen et al. | |
| 2006/0026429 A1 | 2/2006 | Kudo et al. | |
| 2008/0104386 A1 | 5/2008 | Van Rooyen | |
| 2009/0037904 A1 | 2/2009 | Cohen et al. | |

FOREIGN PATENT DOCUMENTS

| | | |
|---|---|---|
| CN | 1811707 A | 8/2006 |
| CN | 101017441 A | 8/2007 |
| CN | 101308470 A | 11/2008 |
| JP | 1992-167139 | 6/1992 |
| JP | 1999-194934 | 7/1999 |
| JP | 1999-306007 | 11/1999 |
| JP | 2000-357093 | 12/2000 |
| JP | 2007-189332 | 7/2007 |

OTHER PUBLICATIONS

ISA/KR, International Search Report dated Jan. 20, 2010, PCT/US2009/042164 filed Apr. 29, 2009.
German Office Action Appl. No. 112009004563.4; dated Jun. 4, 2014; 12 pages.

* cited by examiner

Primary Examiner — Jaweed A Abbaszadeh
(74) Attorney, Agent, or Firm — Chun-Liang Kuo (57) ABSTRACT

A machine and method to manage BIOS images.

15 Claims, 6 Drawing Sheets

BIOS IMAGE MANAGER

BACKGROUND

A BIOS is a basic Input/Output system for a machine. The BIOS initializes and controls hardware components and an operating system of the machine. When performing an update, roll back, and/or recovery on the BIOS, it is desirable to replace the BIOS with another BIOS.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the embodiments.

DETAILED DESCRIPTION

Figure 1:
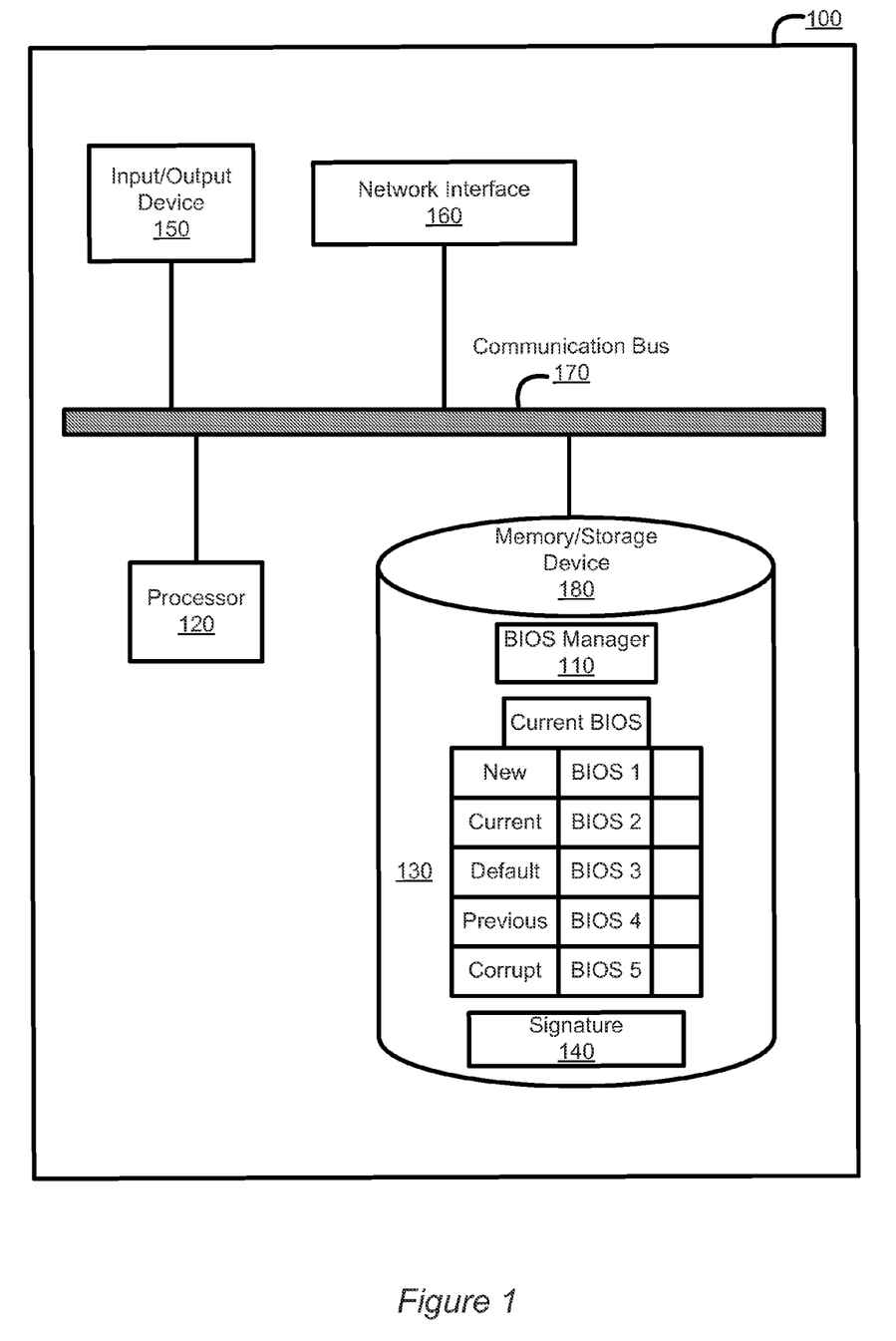
FIG. 1 illustrates a machine with BIOS images managed by a BIOS Manager according to an embodiment of the invention.

FIG. 1 illustrates a machine 100 with BIOS images 130 managed by a BIOS Manager 110 according to an embodiment of the invention. In one embodiment, the machine 100 is a desktop, a laptop, a server, and/or any device that uses a BIOS image. As illustrated in FIG. 1, the machine 100 includes a processor 120, a BIOS manager 110, BIOS images 130, a memory/storage device 180, a signature 140, an input/output device 150, a network interface 160, and a communication bus 170 for the machine 100 and/or one or more components of the machine 100 to communicate with one another. In other embodiments, the machine 100 includes additional components and/or is coupled to additional components in addition to and/or in lieu of those noted above and illustrated in FIG. 1.

As illustrated in FIG. 1, a machine 100 includes a processor 120 coupled to the machine 100. The processor 120 executes instructions to load a BIOS image that the machine 100 uses as a current BIOS. A current BIOS is embedded software that boots a machine 100, initializes and controls the hardware components and operating system of the machine 100. In one embodiment, the current BIOS is embedded onto memory in the machine 100 and stored on a separate or dedicated partition from an operating system on the machine 100. One of the BIOS images 130 accessible by the machine 100 is used as the current BIOS.

The BIOS images 130 are stored on a storage device 180 on the machine 100. The storage device 180 may be included in the machine and/or the storage device 180 may be external and accessible to the machine 100. In one embodiment, the BIOS images 130 are stored on a separate partition of the storage device 180, such as an uEFI partition. The BIOS images 130 are written to and stored on the uEFI partition. In other embodiments, the BIOS images 130 are downloaded from another location to the storage device 180 using a network interface 160 or an input/output device 150 by an application on the operating system or a BIOS manager 110 on the machine 100. The network interface 160 may be a wired or wireless network interface card. Additionally, in one embodiment, the input/output device 150 may be a USB drive or an infra red device.

The BIOS images 130 are written to the storage device 180 by an application running on the operating system. The application may be a software application that is stored on the same partition as the operating system and may be executed by the operating system. Additionally, the application may be a software application separate from a BIOS manager on the machine 100.

As noted above, the BIOS images 130 are managed by a BIOS manager 110. The BIOS manager 110 classifies BIOS images 130 accessible by the machine 100. In one embodiment, the BIOS manager 110 is firmware that is embedded onto the machine 100. In other embodiments, the BIOS manager 110 is a software application stored on the machine 100 within ROM or on a storage device 180 accessible by the machine 100 or the BIOS manager 110 is stored on a computer readable medium readable and accessible by the machine 100 from a different location. In a further embodiment, the BIOS manager 110 is stored and/or accessed through a server coupled through a local area network or a wide area network. The BIOS manager 110 communicates with devices and/or components coupled to the machine 100 physically or wirelessly through a communication bus 170 included in or attached to the machine 100. In one embodiment the communication bus 170 may be a memory bus. In other embodiments, the communication bus 170 may be a data bus.

The BIOS manager 110 classifies BIOS images 130. In one embodiment, the BIOS manager uses headers (FIG. 2) on the BIOS images 130 to classify the BIOS images 130. Alternatively, the BIOS manager 110 uses a BIOS database (FIG. 3) to classify the BIOS images 130. In one embodiment, the BIOS images 130 accessible by the machine 100 are classified with one of the following statuses: current, default, previous, new, and/or corrupt.

The classifications given to the BIOS images 130 are based on a status and/or stability of the corresponding BIOS image, such as current (the BIOS image is presently used as an active BIOS image running the machine 100) or corrupt (the BIOS image determined to not function correctly). Further, classifications are given based on a date created, with the date of creation of the BIOS image classified as current used as a reference, such as previous (a creation date before the current BIOS), new (a creation date after the current BIOS), or default (the original BIOS image on the machine 100 used as an active BIOS). Additional factors and considerations are used and considered when classifying one or more BIOS images 130 accessible to the machine 100 in addition to and/or in lieu of those noted above.

Further, in other embodiments, BIOS images 130 accessible by the machine 100 are additionally classified as stable, most recently used, and/or identified for use with a particular component of the machine 100. Other classifications are given to the BIOS images 130 in addition to and/or in lieu of those noted above. In one embodiment, one or more of the BIOS images 130 includes multiple classifications.

The BIOS manager 110 selects a BIOS image from the BIOS images 130 to replace a current BIOS running the machine 100 based on the classification of the BIOS images 130. In determining whether to replace the current BIOS, the BIOS manager 110 initially scans the current BIOS for one or more flags that are marked in the current BIOS. The BIOS manager 110 performs the scan when the machine 100 powers on and loads the current BIOS. Additionally, the BIOS manager 110 determines to replace the current BIOS when the current BIOS is determined to be corrupt.

One or more flags are indicators of the corresponding BIOS image used to represent different statuses of the corresponding BIOS image. The BIOS images 130 may include multiple flags that represent when the corresponding BIOS is the current BIOS and whether to perform an update, roll back, and/or recovery. In other embodiments, the flags indicate when to choose the corresponding BIOS in cases of updating, rolling back, and/or when the current BIOS is corrupt. In additional embodiments, the flags may indicate that the corresponding BIOS image has priority over other BIOS images 130 with the same classification and/or when an update, roll back, and/or recovery was successful. The flags may be stored as part of the BIOS images 130 and may be marked with a 1 or 0. Additionally, the flags may be marked by the BIOS manager 110 or the application from the operating system.

One or more flags are read by the BIOS manager 110 to determine which classification and/or which BIOS image to select when replacing the current BIOS. In one embodiment, one or more flags is an update flag marked by an application from the operating system on the machine 100 marking the flag with a 1. As a result, the BIOS manager 110 searches the BIOS images 130 for a BIOS image with a classification of New. Additionally, one or more flags is a roll back or a corrupt flag indicating to replace the current BIOS with a BIOS image classified as previous or default. As a result, the selection of a BIOS image from the BIOS images 130 utilized to replace the current BIOS is based on a classification of the BIOS images 130.

In one embodiment, the BIOS manager 110 determines that an update flag is marked. The BIOS manager 110 then searches the BIOS images 130 for a BIOS image classified as new. Once the BIOS manager 110 has found a BIOS image classified as new, the BIOS manager 110 proceeds to update the current BIOS by replacing the current BIOS with the BIOS image classified as new.

In another embodiment, the BIOS manager 100 determines that the current BIOS is corrupt. A BIOS image is corrupt if it does not function correctly or it is installed incorrectly onto the machine 100. The BIOS manager 110 proceeds to scan the BIOS images 130 for a BIOS image classified as previous or default. Once the BIOS manager 110 has found a BIOS image classified as previous or default, the BIOS manager 110 proceeds to replace the current BIOS determined to be corrupt with the selected BIOS image classified as previous or default.

In one embodiment, if the BIOS manager 110 finds one BIOS image classified as default and additional BIOS images 130 classified as previous, the BIOS manager 110 may choose the BIOS image classified as default. In another embodiment, the BIOS manager 110 may scan the BIOS images 130 classified as previous or default for a priority flag. If any of the BIOS images 130 classified as previous or default include the priority flag, the BIOS manager 110 may select the BIOS image with the priority flag.

Before choosing the BIOS image classified as previous or default, the BIOS manager 110 further checks that the BIOS image is not additionally classified as corrupt. If the BIOS image is additionally classified as corrupt, the BIOS manager proceeds to scan for and select another BIOS image classified as previous or default.

Further, in other embodiments, the BIOS manager 110 determines that a roll back flag is marked in the current BIOS. Similar to recovering from a current BIOS determined to be corrupt, the BIOS manager 110 proceeds to scan the BIOS images 130 for a BIOS image classified as previous or default. Once, the BIOS manager 110 has found a BIOS image classified as previous or default, the BIOS manager 110 reverts to a BIOS image classified as previous or default.

Similar to an embodiment, disclosed above, if the BIOS manager 110 finds one BIOS image classified as default and additional BIOS images 130 classified as previous, the BIOS manager 110 may choose the BIOS classified as default. In other embodiments, the BIOS manager 110 may scan the BIOS images 130 classified as previous or default for a priority flag. If any of the BIOS images 130 classified as previous or default include the priority flag, the BIOS manager 110 may select the BIOS image with the priority flag.

Further, before replacing the current BIOS, the BIOS manager 110 scans the selected BIOS image to determine whether the selected BIOS image has a binary signature that matches a signature 140 on the machine 100. A signature 140 on the machine 100 is a sequence of binary numbers utilized to identify that the corresponding BIOS image is compatible and/or stable with the machine 100. In other embodiments, other suitable signatures 140 may be employed. The signature 140 may be stored on the storage device 180. If the binary signature of the selected BIOS image matches the signature 140 stored on the machine 100, the BIOS manager 110 proceeds to replace the current BIOS with the selected BIOS image by overwriting the current BIOS with the selected BIOS image. Otherwise, the BIOS manager 110 continues to search the BIOS images 130 for another BIOS image that is utilized to replace the current BIOS until a matching binary signature is found and the current BIOS has been overwritten.

Once the current BIOS has been replaced by a BIOS image selected from the BIOS images 130, the BIOS manager 100 determines that the selected BIOS image is to be the current BIOS. The BIOS manager 110 additionally determines whether the current BIOS is corrupt. If the current BIOS is corrupted, the BIOS manager 110 proceeds to attempt to recover by reverting back to a BIOS image classified as previous or default. Once the BIOS manager 110 determines that the current BIOS is not corrupted, the BIOS manager 110 proceeds to mark a success flag on the current BIOS. Additionally, the BIOS manager proceeds to update the classification of at least two of the BIOS images 130.

In updating the classification of BIOS images 130, the BIOS manager 110 modifies a header (FIG. 2) of corresponding BIOS images 130 whose classification is to be updated. Additionally, the BIOS manager 110 updates a corresponding entry in a BIOS database (FIG. 3) listing BIOS images 130 that the machine 100 accesses. In updating the classification of at least two of the BIOS images 130, the BIOS manager 110 reclassifies the BIOS image classified as current as previous. Additionally, the BIOS manager 110 reclassifies the BIOS image selected to replace the current BIOS as current. After updating the classification of at least two BIOS images 130, in one embodiment, the BIOS manager 110 additionally proceeds to delete BIOS images 130 classified as corrupt. Additionally, the BIOS manager 110 attempts to replace the BIOS images 130 classified as corrupt if backup BIOS images 130 of the corrupted BIOS images 130 are available.

Figure 2:
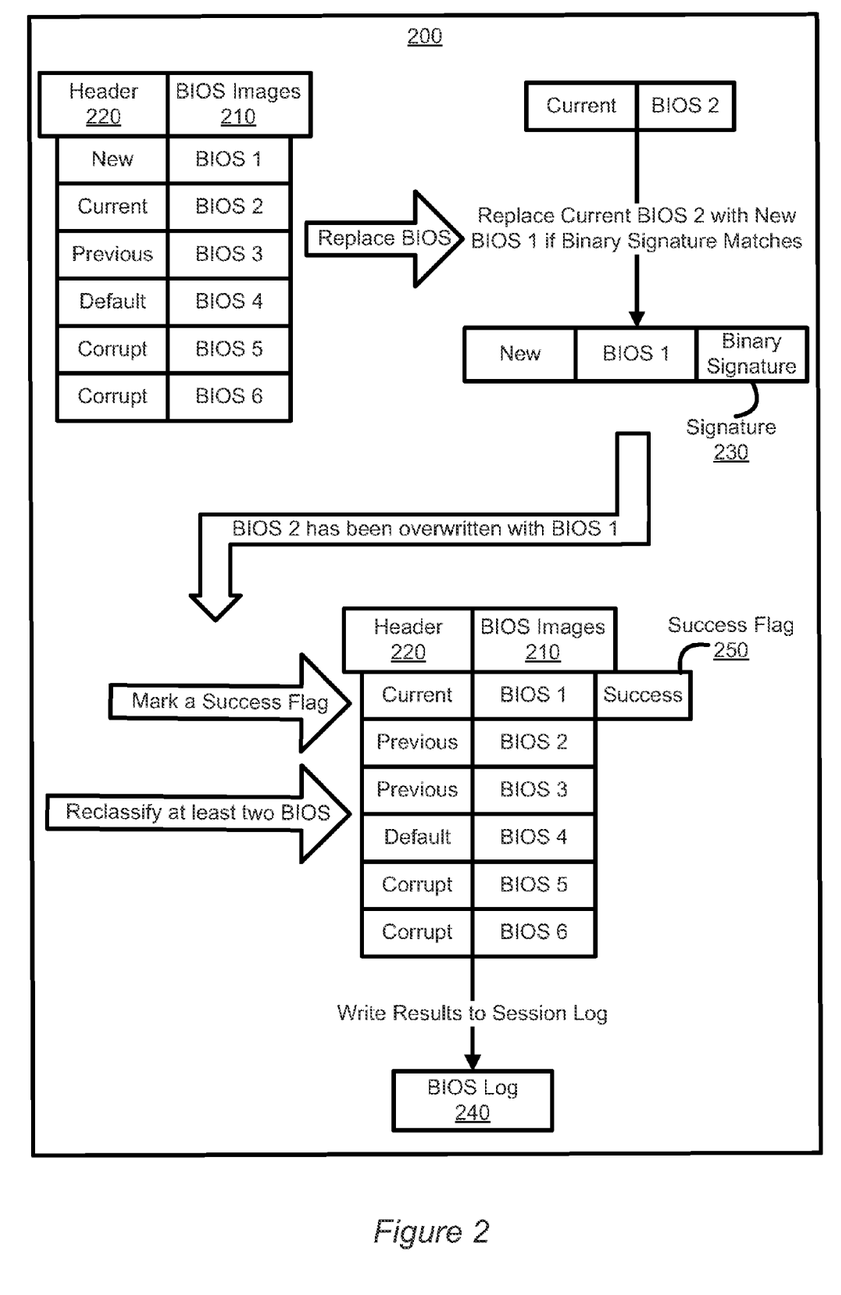
FIG. 2 illustrates a flow diagram of BIOS images being classified and a classification of at least two BIOS images being updated when a current BIOS has been replaced according to an embodiment of the invention.

FIG. 2 illustrates a flow diagram of BIOS images 210 being classified and a classification of at least two BIOS images 210 being updated when a current BIOS has been replaced according to an embodiment of the invention. As noted above, a BIOS manager on the machine 200 classifies the BIOS images 210 accessible by the machine 200. Additionally, as noted above, the BIOS images 210 accessible by the machine 200 also includes a corresponding header 220 that is configured to specify the classification of the corresponding BIOS images 210.

As illustrated in FIG. 2, in one embodiment, a header 220 is a separate file that is automatically accessed and read when the corresponding BIOS image 210 is accessed. In other embodiments, a header 220 is included in the corresponding BIOS image 210 file itself. The header 220 is filled and/or written to by the BIOS manager to declare or identify the status of the corresponding BIOS image 210. As noted above, and illustrated in FIG. 2, BIOS images 210 are classified as new, current, previous, default, and/or corrupt. Additionally, as illustrated in FIG. 2, BIOS image 1 is initially classified as new and BIOS image 2 is initially classified as current.

The BIOS manager then replaces BIOS image 2, classified as current, with a BIOS image on the machine 200 if a binary signature 230 of the BIOS image 1 matches a binary signature 230 stored on the machine 200. Further, as shown in FIG. 2, in one embodiment, BIOS image 1, classified as new, is selected to replace the current BIOS, BIOS image 2. As a result, because the current BIOS, BIOS image 2, is being replaced with BIOS image 1, classified as new, the BIOS manager is performing an update. After overwriting the current BIOS, the BIOS manager proceeds to update the classification of at least two BIOS images 210.

As shown in FIG. 2, in updating the classification of at least two BIOS images 210, the BIOS manager reclassifies BIOS image 2 by overwriting the header 220 of BIOS 2 from current to previous and reclassify BIOS image 1 by overwriting the header 220 of BIOS 1 from new to current. Further, as noted above and illustrated in FIG. 2, after overwriting the BIOS image previously classified as current, the BIOS manager proceeds to mark a success flag 250 on the current BIOS, BIOS image 1. Similar to a header 220 for the corresponding BIOS image, the success flag 250 is a separate file accessed when the current BIOS is accessed. In other embodiments, the success flag 250 is part of the current BIOS. As noted above, the original current BIOS has been replaced with BIOS image 1. As a result, BIOS image 1 is now the current BIOS and the success flag 250 on BIOS image 1 will be marked.

Once the BIOS manager has reclassified at least two BIOS images 210 and marked a success flag 250 on the current BIOS, the BIOS manager additionally writes the classification of BIOS images 210 accessible to the machine 200 to a BIOS log 240. In some embodiments, the success flag 250 is not used. In one embodiment, the BIOS log 240 is a document or file stored on the machine 200 that lists BIOS images 210 accessible to the machine 200, as well as classifications for BIOS images 210 after the current BIOS on the machine 200 has been replaced. Additionally, the BIOS log 240 is updated and/or overwritten when a current BIOS has been replaced on the machine 200.

The BIOS log 240 is stored on a storage device accessible to the machine 200. As noted above, the storage device is an internal or an external storage device coupled to or included in the machine 200. Further, the BIOS log 240 is stored on a partition of the storage device where the BIOS images 210 are stored. In addition, the BIOS log 240 is accessed by an operating system of the machine 200. The operating system accesses the BIOS log 240 and identifies BIOS images 210 accessible to the machine 200 as well as classifications for BIOS images 210. If no BIOS log 240 is present and/or accessible, the operating system proceeds to access the separate partition where the BIOS images 210 are stored and scans the headers 220 of BIOS images 210 for the classification of the corresponding BIOS images 210.

In one embodiment, the operating system accesses the BIOS log 240 to identify BIOS images 210 classified as corrupt, BIOS images 5 and 6. In another embodiment, the operating system scans the headers 220 and identifies that BIOS images 5 and 6 have headers 220 showing that the classifications are corrupt. Once the operating system has identified BIOS images 210 classified as corrupt, the operating system proceeds to delete the corrupt BIOS images, BIOS image 5 and 6. Alternatively, the operating system proceeds to attempt to repair the corrupt BIOS images 5 and 6 and/or replace the corrupted BIOS images. The operating system replaces the corrupt BIOS images utilizing a recovery tool or it replaces the corrupt BIOS images by downloading and/or accessing non-corrupt versions of the BIOS images 210 classified as corrupt through a network interface or an input/output device on the machine 200.

Figure 3:
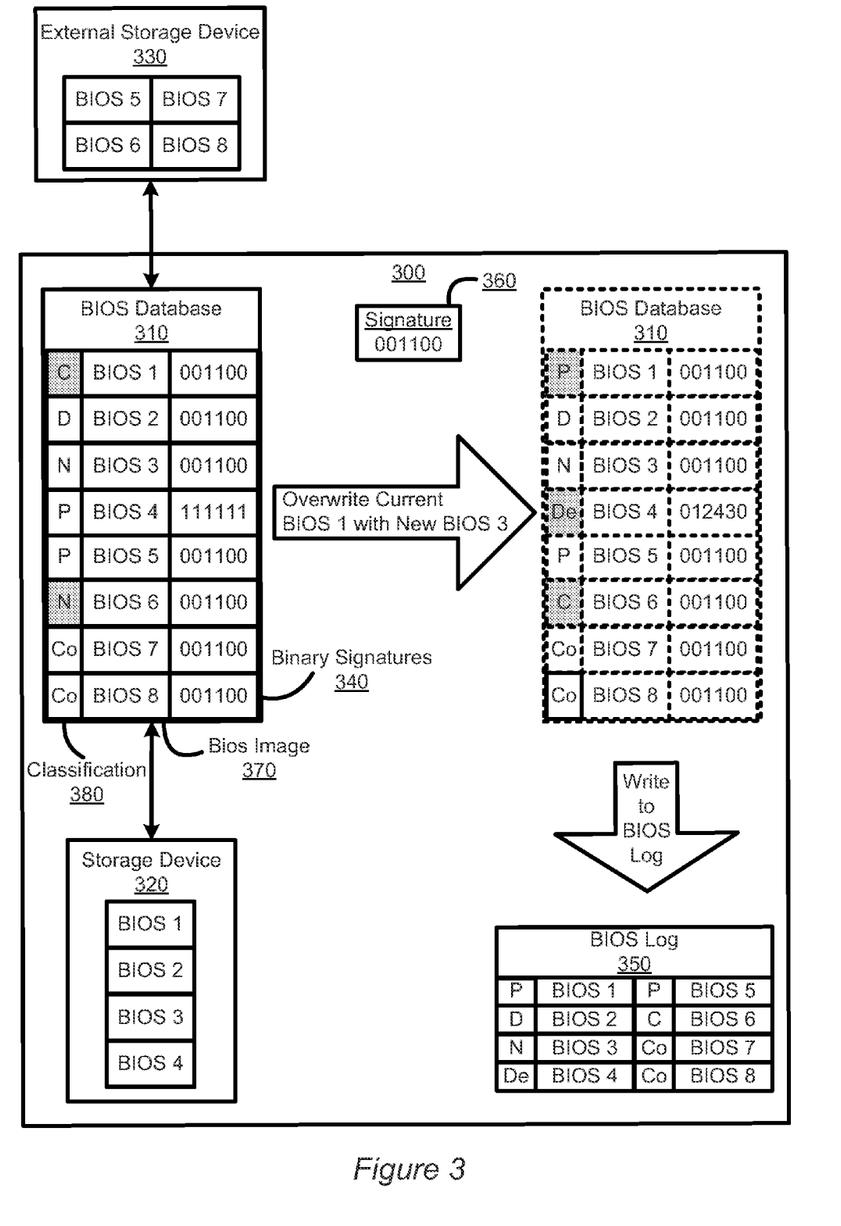
FIG. 3 illustrates a BIOS database listing and updating classifications of BIOS images and a BIOS Log being written to when a current BIOS of a machine is replaced according to an embodiment of the invention.

FIG. 3 illustrates a BIOS database 310 listing and updating classifications 380 of BIOS images 370 and a BIOS 350 Log being written to by a BIOS manager when a current BIOS of a machine is replaced according to an embodiment of the invention. As illustrated in FIG. 3, the machine 300 includes a BIOS database 310. A BIOS database 310 is a database listing BIOS images 370 accessible by the machine 300, as well as classifications 380 for the corresponding BIOS images 370. In one embodiment, the BIOS database 310 may list and stored the BIOS images 370. In other embodiments, the BIOS database 310 lists memory addresses of where the BIOS images 370 are stored. Further, the BIOS database 310 includes a classification field 380 and a binary signature field 340 for BIOS images 370 listed in the BIOS database 310. Additionally, as shown in FIG. 3, the BIOS database 310 is stored on the machine 300. In other embodiments, the BIOS database 310 is stored on a storage device 320 or an external storage device 330 accessible to the machine 300.

As shown in FIG. 3, the BIOS database 310 is coupled to a storage device 320 in the machine 300. In one embodiment, the BIOS database 310 initially identifies that machine 300 includes a storage device 320 with BIOS images 1, 2, 3, and 4. The BIOS database 310 proceeds to list BIOS images 370 on the storage device 320 as well as the classification and the binary signatures of BIOS images 370 on the storage device 320. As shown in FIG. 3, in one embodiment, the classifications for BIOS images 370 listed in the BIOS database 310 is abbreviated. In other embodiments, a binary code or sequence of binary numbers may be used to classify the BIOS images 370. The BIOS manager then detects that an external storage device 330 is coupled to the machine 300 and the BIOS manager identifies that the external storage device 330 includes BIOS images 5, 6, 7, and 8. The BIOS manager then proceeds to update the BIOS database 310 to include BIOS images 5, 6, 7, and 8, as well as their classifications and binary signatures in the BIOS database 310.

In one embodiment, if the BIOS manager detects that there are BIOS images stored on the external storage device 330, the BIOS manager gives priority to BIOS images 5, 6, 7, and 8 on the external storage device 330 when selecting a BIOS image to replace a current BIOS. As noted above, in one embodiment, a BIOS image may include a priority flag marked. The BIOS manager may give priority to the BIOS image with the priority flag marked. Further, in another embodiment, once the BIOS database 310 lists BIOS images 370 accessible to the machine 300, the BIOS manager proceeds to execute an instruction to overwrite the current BIOS with BIOS image 6 classified as New. As noted above, in one embodiment, if an external storage device 330 is attached to the machine 300 and the external storage device 330 includes BIOS images 370, the BIOS images 370 on the external storage device 330 are given priority over BIOS images 370 on the storage device 320 when selecting a BIOS image to replace the current BIOS.

As illustrated in FIG. 3, both BIOS image 3 and 6 have a classification of N (new) in the BIOS database 310, however because BIOS image 6 is stored on the external storage device 330 it will be given priority. Additionally, BIOS image 6 may have a priority flag marked. As noted above, before overwriting the current BIOS, the BIOS manager checks the binary signature of the BIOS image 3 listed in the BIOS database 310 to insure that the binary signature of BIOS image 3 matches a signature 360 stored on the machine 300. As noted above, in one embodiment, the signature 360 is a binary signature. Additionally, the signature 360 is a 6 digit sequence of numbers. As shown in FIG. 3, the binary signature of BIOS image 6, 001100, matches the signature 360 stored on the machine 300, 001100. Once the BIOS manager has verified the binary signature of BIOS image 6, the BIOS manager proceeds to overwrite the current BIOS with BIOS image 6 and updates a classification 380 of at least two BIOS images 370 listed in the BIOS database 310.

As shown in FIG. 3, the BIOS manager additionally updates the classification of BIOS images 1 and 6 and their corresponding classification fields in the BIOS database 110. The classification field of BIOS image 1 in the BIOS database 310 is overwritten from C (current) to P (previous). Additionally, the classification field of BIOS image 6 in the BIOS database 310 is overwritten from N (new) to C (current). In one embodiment, the BIOS manager additionally scans binary signature fields 340 of the BIOS database 110 to insure that the binary signatures of BIOS images 370 listed in the BIOS database 110 match the signature 360 in the machine 300. As illustrated in FIG. 3, the binary signature field of BIOS 4 shows the signature to be 111111. As a result, the BIOS 4 binary signature does not match the signature on the machine 300, 001100. In one embodiment, the BIOS manager proceeds to change the classification of BIOS image 4 to De (delete). In another embodiment, the BIOS manager proceeds to delete the BIOS image 4 listing from the BIOS database 310. Additionally, the BIOS manager further deletes BIOS image 4 from the storage device 320.

Once the BIOS database 310 has been updated, the BIOS manager writes references of the BIOS images 370 listed in the BIOS database 310 as well as the classification for the corresponding BIOS images 370 listed in the BIOS database 310 to a BIOS log 350. As illustrated in FIG. 3, the BIOS log 350 lists BIOS images 1, 2, 3, 4, 5, 6, 7, and 8. Further, the BIOS log 350 lists the classifications of BIOS images 370 after at least two classifications of the BIOS images 370 have been updated. As shown in FIG. 3, the BIOS log 350 reflects that BIOS image 3 has been reclassified as C (current), BIOS image 1 has been reclassified as P (previous), and BIOS image 4 has been reclassified as De (delete). As noted above, the BIOS log 350 is accessible by an operating system on the machine 300 to identify BIOS images 370 to replace and/or delete.

Figure 4:
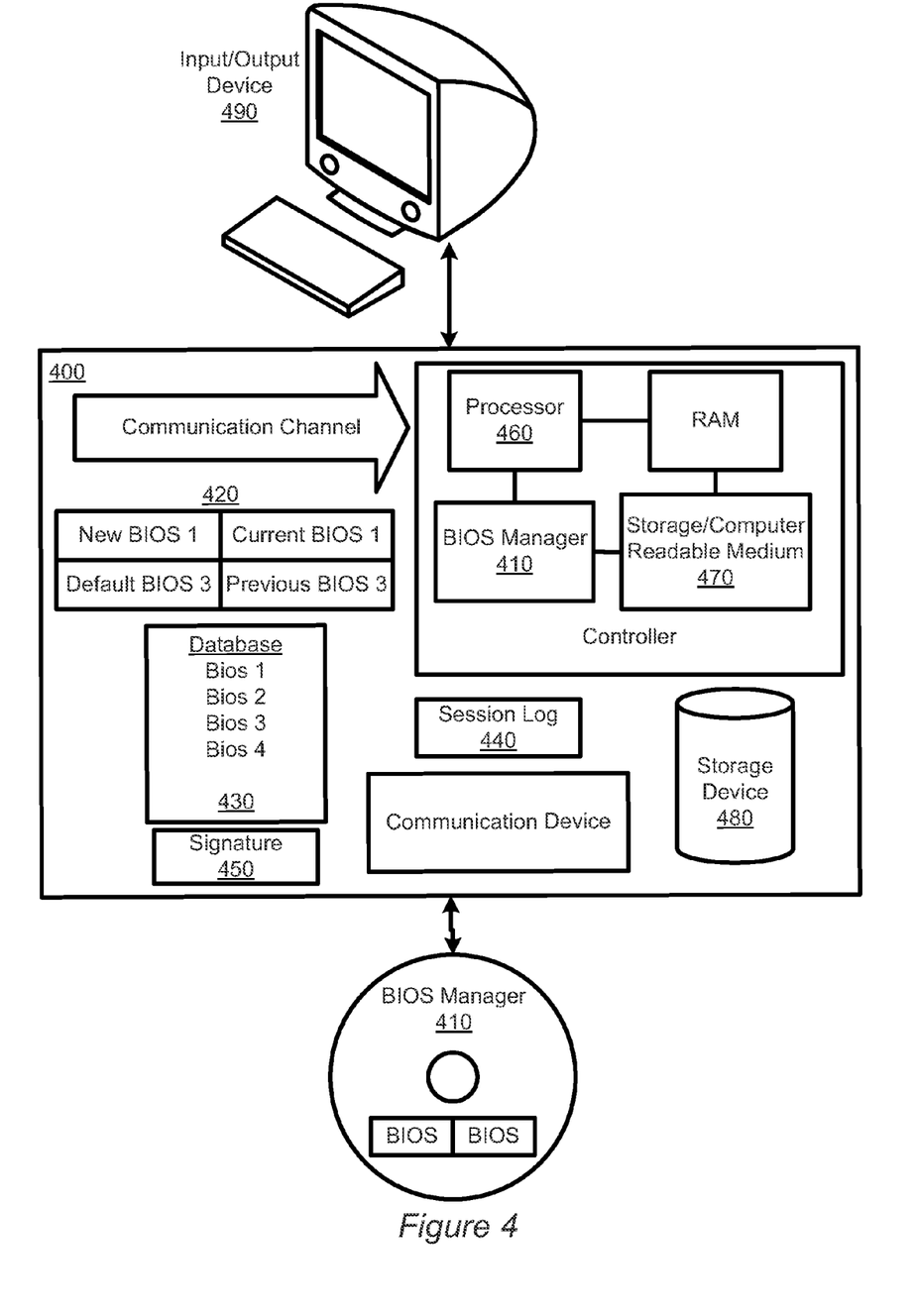
FIG. 4 illustrates a machine with an embedded BIOS Manager and a BIOS Manager stored on a removable medium being accessed by the machine according to an embodiment of the invention.

FIG. 4 illustrates a machine 400 with an embedded BIOS Manager 410 and a BIOS Manager 410 stored on a removable medium being accessed by the machine 400 according to an embodiment of the invention. For the purposes of this description, a removable medium is any tangible apparatus that contains, stores, communicates, or transports the application for use by or in connection with the machine. As noted above, in one embodiment. the BIOS manager 410 is firmware that is embedded into one or more components of the machine 400 as ROM. In other embodiments, the BIOS manager 410 is a software application which is stored and accessed from a hard drive, a compact disc, a flash disk, a network drive or any other form of computer readable medium that is coupled to the machine 400.

Figure 5:
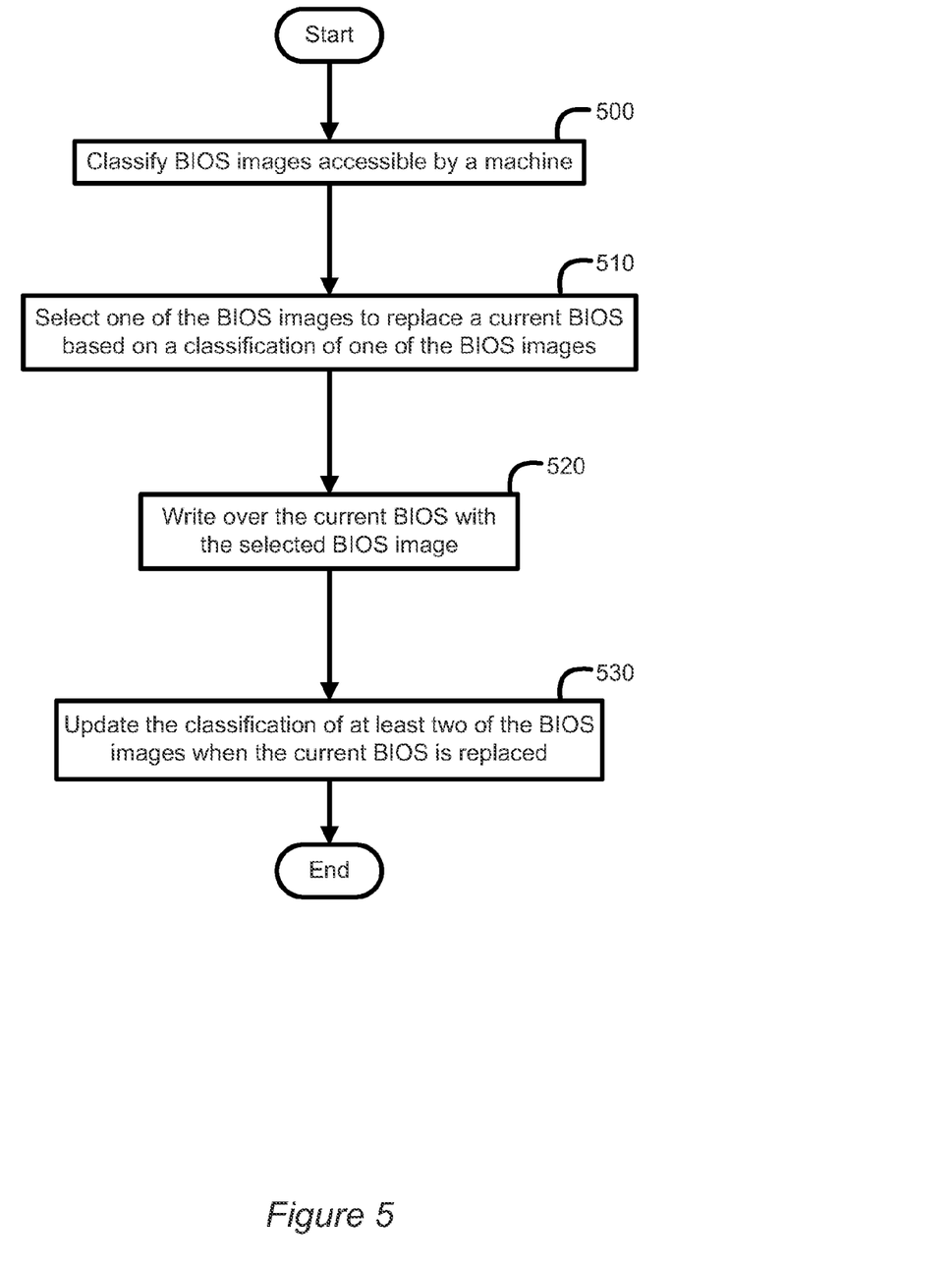
FIG. 5 is a flow chart illustrating a method for BIOS image management according to an embodiment of the invention.

FIG. 5 is a flow chart illustrating a method for BIOS image management according to an embodiment of the invention. The method of FIG. 5 uses a storage device accessible to a machine, BIOS images stored on the storage device, and a BIOS manager on the machine. In other embodiments, the method of FIG. 5 uses additional components and/or devices in addition to and/or in lieu of those noted above and illustrated in FIGS. 1, 2, 3, and 4.

The BIOS manager initially classifies BIOS images accessible by a machine 500. As noted above, the BIOS images are classified based on a status and/or stability of the corresponding BIOS image. In some embodiments, the BIOS images are classified based on dates of the BIOS images. In one embodiment, the BIOS images are classified as new, current, corrupt, previous, and/or default. Additionally, as noted above, the BIOS manager accesses BIOS images that are stored on a storage device accessible by the machine. After the BIOS images have been classified, the BIOS manager selects one of the BIOS images to replace a current BIOS based on a classification of one of the BIOS images 510. As noted above, the BIOS manager selects a BIOS image classified as new when updating. Additionally, the BIOS manager selects a BIOS image classified as previous and/or default when rolling back to a previous BIOS or recovering from a current BIOS determined to be corrupt.

Once a BIOS image has been selected, the BIOS manager overwrites the current BIOS with the selected BIOS image 520. After the current BIOS has been replaced with the selected BIOS image, the BIOS manager proceeds to update the classification of at least two of the BIOS images when the current BIOS is replaced 530. In one embodiment, if the selected BIOS image had a classification of default, the BIOS manager proceeds to update the classification of the BIOS image classified as current, from current to previous, and the selected BIOS image from default to current.

The process is then complete or the BIOS manager continues to manage and update classifications of BIOS images when a current BIOS on the machine is replaced by repeating the method disclosed in FIG. 5. In one embodiment, the method of FIG. 5 includes additional steps in addition to and/or in lieu of those depicted in FIG. 5.

Figure 6:
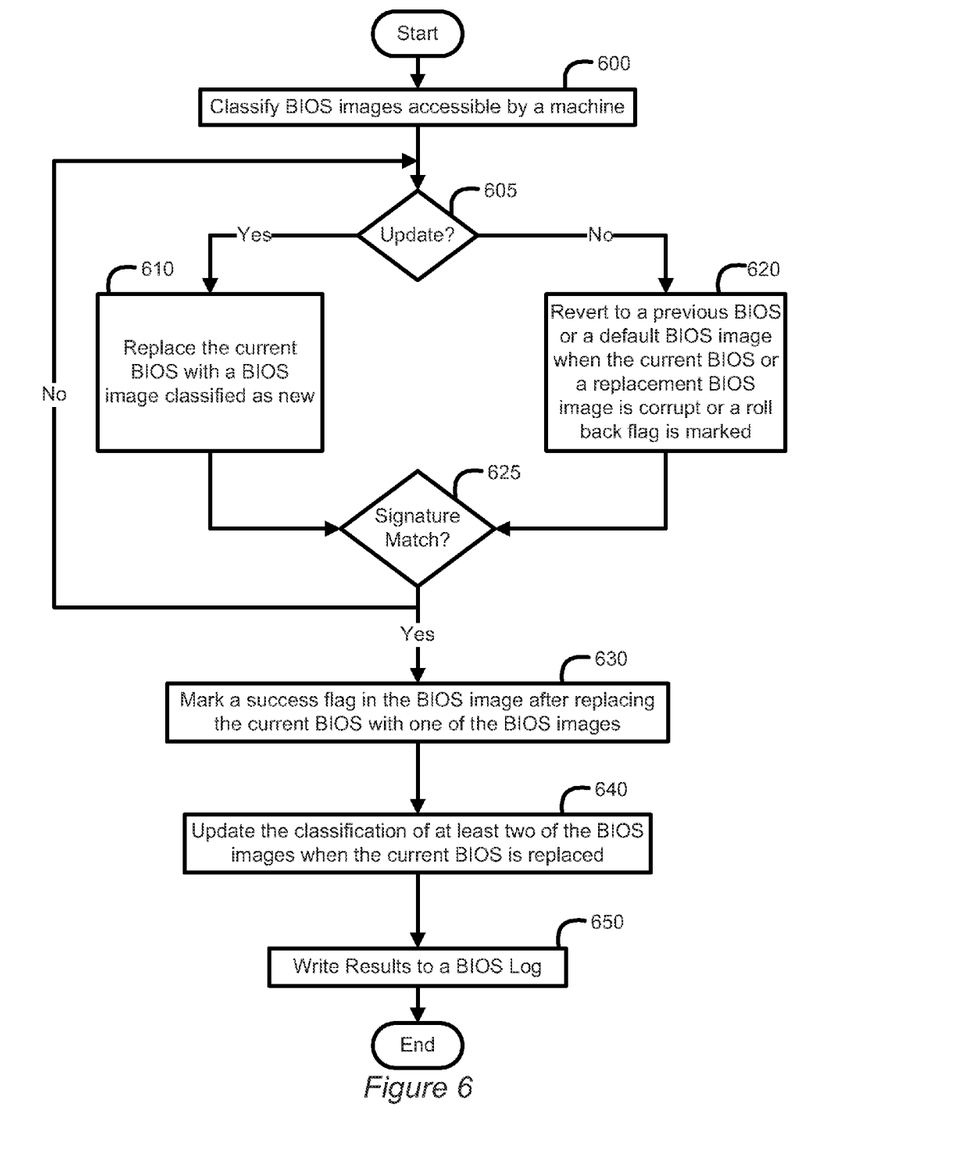
FIG. 6 is a flow chart illustrating a method for BIOS image management according to another embodiment of the invention.

FIG. 6 is a flow chart illustrating a method for BIOS image management according to another embodiment of the invention. The method of FIG. 6 uses BIOS images accessible to a machine, a database on the machine, a signature to verify the BIOS images, a BIOS log to record changes in classification to the BIOS images, and a BIOS manager. In other embodiments, the method of FIG. 6 uses additional components and/or devices in addition to and/or in lieu of those noted above and illustrated in FIGS. 1, 2, 3, and 4.

As illustrated in FIG. 6, the BIOS manager initially classifies BIOS images accessible by the machine 600. The BIOS images are classified based on a status and/or stability of the corresponding BIOS image. In one embodiment, the BIOS images are given the classification of at least one from the group consisting of: new, current, corrupt, previous, and/or default. In other embodiments, the BIOS images are classified based on dates of the BIOS images. As noted above, the BIOS images accessible to the machine are listed and organized in a BIOS database. Additionally, the BIOS images include headers that are configured to list the classification of corresponding BIOS images. After the BIOS images are classified, the BIOS manager scans for a request to replace a current BIOS on the machine 605. As noted above, in scanning and/or determining whether to replace the current BIOS, the BIOS manager determines whether a flag on the current BIOS is marked or the current BIOS is corrupt.

If the current BIOS has an update flag marked, the BIOS manager proceeds to replace the current BIOS and updates the machine with a BIOS image classified as new 610. If the current BIOS does not have an update flag marked, the BIOS manager additionally determines whether the current BIOS is corrupted or a roll back has been requested. If the current BIOS is corrupt or the current BIOS has a roll back flag marked, the BIOS manager proceeds to revert back to a previous BIOS image or a default BIOS image 620.

Additionally, as noted above, in one embodiment, the BIOS manager additionally checks a signature of the BIOS image used to replace the current BIOS 625. If the signature of the selected BIOS image does not match, then the BIOS manager rejects the selection of the BIOS image and returns to determine whether a request to update, roll back and/or corrupt has been made. Once the BIOS manager has chosen a BIOS image that has a matching signature to replace the current BIOS, the BIOS manager proceeds to replace the current BIOS and marks a success flag in the new BIOS image classified as current 630.

Further, the BIOS image manager updates the classification of at least two of the BIOS images when the current BIOS is replaced 640. As noted above, in one embodiment, if the current BIOS was determine to be corrupt, the BIOS manager proceeds to change the classification of the current BIOS to corrupt and the selected BIOS image utilized to replace the corrupted BIOS image as current. Further, the BIOS manager records a summary of the updates to classifications made to BIOS images on the machine to a BIOS Log after replacing the current BIOS and updating at least two classifications 650. The process is then complete or the BIOS manager proceeds to continue to manager BIOS images by repeating the method disclosed in FIG. 6. In one embodiment, the method of FIG. 6 includes additional steps in addition to and/or in lieu of those depicted in FIG. 6.

By classifying BIOS images accessible to a machine and updating classifications of BIOS images when a current BIOS on the machine has been updated, rolled back, and/or recovered, time may be saved and stability and convenience may be increased. Additionally, by verifying a signature of a selected BIOS image before replacing the current BIOS and writing the BIOS images and classifications to a BIOS log, security and BIOS stability may be increased.

What is claimed is:

1. A method for BIOS image management comprising:
   classifying BIOS images accessible by a machine;
   selecting one of the BIOS images to replace a current BIOS based on a classification of one of the BIOS images; and
   writing over the current BIOS with the selected BIOS image;
   updating the classification of at least two of the BIOS images when the current BIOS is replaced.

2. The method for BIOS image management of claim 1 wherein each BIOS image includes a header configured to specify the classification of each corresponding BIOS image.

3. The method for BIOS image management of claim 1 wherein updating the classification of at least one BIOS image includes reclassifying a BIOS image that has been replaced as previous and reclassifying one of the BIOS images as current.

4. The method for BIOS image management of claim 1 further comprising scanning one of the BIOS images for a recognized binary signature before replacing the current BIOS.

5. The method for BIOS image management of claim 1 further comprising marking a success flag in one of the BIOS images after replacing the current BIOS with one of the BIOS images.

6. A machine comprising:
   a processor coupled to computer readable memory accessible by the machine;
   BIOS images stored on the machine;
   a BIOS manager executable from the computer readable memory and configured to perform the steps of:
   replacing a current BIOS; and
   changing a stored classification of at least two of the BIOS images;
   wherein selection of a replacement BIOS image used to replace the current BIOS is based on a classification of the replacement BIOS image.

7. The machine of claim 6 further comprising a BIOS database configured to list each BIOS and the classification of each BIOS.

8. The machine of claims 6 further comprising a BIOS log which lists classifications for each BIOS image after the current BIOS has been replaced.

9. The machine of claims 6 wherein the BIOS manager is additionally configured to replace the current BIOS with a BIOS image from an external storage device when the external device is coupled to the machine.

10. The machine of claim 8 wherein the BIOS log is accessible by an operating machine to repair or replace BIOS images classified by the BIOS log as corrupt.

11. A computer-readable program in a non-transitory computer-readable medium comprising:
    a BIOS manager configured to classify BIOS images accessible by a machine;
    the BIOS manager further configured to select one of the BIOS images to replace a current BIOS based on a classification of one of the BIOS images;
    the BIOS manager further configured to write over the current BIOS with one of the BIOS images; and
    the BIOS manager further configured to reclassify at least two of the BIOS images after replacing the current BIOS.

12. The computer-readable program in the non-transitory computer-readable medium of claim 11 wherein the BIOS manager is further configured to replace the current BIOS with a BIOS image classified as new when the current BIOS has an update flag marked.

13. The computer-readable program in the non-transitory computer-readable medium of claim 11 wherein the BIOS manager is further configured to revert to a BIOS image classified as previous or default when the current BIOS has a roll back flag marked.

14. The computer-readable program in the non-transitory computer-readable medium of claim 11 wherein the BIOS manager is further configured to revert to a BIOS image classified as previous or default when the current BIOS or a replacement BIOS image is determined to be corrupt.

15. The computer-readable program in the non-transitory computer-readable medium of claim 14 wherein the BIOS manager is further configured to delete or replace BIOS images that are classified as corrupt.

* * * * *

UNITED STATES PATENT AND TRADEMARK OFFICE
CERTIFICATE OF CORRECTION

| | | |
|---|---|---|
| PATENT NO. | : 8,850,173 B2 | Page 1 of 1 |
| APPLICATION NO. | : 13/260307 | |
| DATED | : September 30, 2014 | |
| INVENTOR(S) | : Landry et al. | |

It is certified that error appears in the above-identified patent and that said Letters Patent is hereby corrected as shown below:

In the Claims

Column 10, line 29, Claim 8, delete "claims" and insert -- claim --, therefor.

Column 10, line 32, Claim 9, delete "claims" and insert -- claim --, therefor.

Signed and Sealed this
Third Day of February, 2015

Michelle K. Lee
*Deputy Director of the United States Patent and Trademark Office*